(12) United States Patent
Guntveit et al.

(10) Patent No.: US 6,994,023 B2
(45) Date of Patent: Feb. 7, 2006

(54) COMPACTOR DEVICE

(75) Inventors: Lars Guntveit, Vollen (NO); Hans Ulrik Rustad, Stavern (NO); Neils Erik Andersen, Vollen (NO)

(73) Assignee: Repant AS, Drammen (NO)

( * ) Notice: Subject to any disclaimer, the term of this patent is extended or adjusted under 35 U.S.C. 154(b) by 0 days.

(21) Appl. No.: 10/398,328

(22) PCT Filed: Sep. 20, 2001

(86) PCT No.: PCT/NO01/00381

§ 371 (c)(1),
(2), (4) Date: Aug. 19, 2003

(87) PCT Pub. No.: WO02/28628

PCT Pub. Date: Apr. 11, 2002

(65) Prior Publication Data

US 2004/0016354 A1    Jan. 29, 2004

(30) Foreign Application Priority Data

Oct. 4, 2000  (NO) ................................. 20005012

(51) Int. Cl.
*B30B 5/04*    (2006.01)
(52) U.S. Cl. ....................... 100/902; 100/151
(58) Field of Classification Search ............... 100/151, 100/233, 234, 243, 265, 902; 241/99
See application file for complete search history.

(56) References Cited

U.S. PATENT DOCUMENTS

| | | | |
|---|---|---|---|
| 1,140,676 A | * 5/1915 | Gray | ........................ 100/151 |
| 3,077,827 A | 2/1963 | Bunke et al. | |
| 3,996,848 A | * 12/1976 | Molitorisz | ................... 100/73 |
| 4,373,435 A | 2/1983 | Grevich | |
| 4,653,627 A | * 3/1987 | Hampson et al. | ........... 194/209 |
| 5,211,109 A | * 5/1993 | Determan | ................ 100/98 R |
| 5,522,311 A | 6/1996 | Horsrud et al. | |
| 6,131,509 A | * 10/2000 | Davis | .......................... 100/39 |

FOREIGN PATENT DOCUMENTS

| | | |
|---|---|---|
| DE | 30 38 299 | 5/1982 |
| DE | WO99/61231 | * 12/1999 |
| EP | 0 444 745 | 9/1991 |
| JP | 5-200593 | * 8/1993 |
| WO | 00/40397 | 7/2000 |

* cited by examiner

Primary Examiner—Derris H. Banks
Assistant Examiner—Shelley Self
(74) Attorney, Agent, or Firm—Andrus, Sceales, Starke & Sawall, LLP

(57) ABSTRACT

A compactor device for the automatic compacting of empty containers (5), e.g. disposable bottles/cans of metal, plastic, glass or other suitable material, wherein the container (5) is essentially being pressed flat and possibly punctured, possibly crushed, and wherein the compacting area is formed by a cuneiform area between a conveyor belt (20) and a first jaw set (36a) and a second jaw set (36b), and wherein a plurality of jaws (32), which are provided with teeth on their active side, are arranged in such a way that each alternate jaw (32), as seen transversally to the longitudinal direction of the conveyor belt (20), is connected to the jaw sets (36a) and (36b) respectively, the jaw sets (36a) and (36b) being rotatably connected to two common eccentric shafts (38, 38'), and the eccentric shafts (38, 38') being formed in such a way that the eccentric motion of the jaw sets (36a, 36b) is out of phase, typically by 180 degrees.

8 Claims, 6 Drawing Sheets

COMPACTOR DEVICE

CROSS REFERENCE TO RELATED APPLICATION

The present application is the U.S. national stage application of International Application PCT/NO01/00381, filed Sep. 20, 2001, which international application was published on Apr. 11, 2002 as International Publication WO 02/28628. The International Application claims priority of Norwegian Patent Application 20005012, filed Oct. 4, 2000.

SUMMARY OF THE INVENTION

The present invention relates to a device for the automatic compacting of empty containers, for example disposable bottles and cans of metal, plastic, glass or other material suitable for such containers. The device is particularly suitable as part of a reverse vending machine which receives used beverage packaging.

In the receipt and transport of empty containers it is desirable that the used packaging in the form of bottles and cans should occupy the smallest possible volume to reduce the transport costs.

In reverse vending machine installations for automatic receipt of packaging there is also a need for reducing the space that this material occupies behind the return insert opening because this space is often limited. Additionally, it is also important that said machine has as large a storing capacity as possible to prevent having to empty the collecting receptacles too often. Such emptying entails disturbance in the work of those responsible for emptying the receptacles, typically the staff of grocery stores, who want mainly to spend the time assisting customers.

In a reverse vending machine installation it is also important that the empty packaging is deformed in such a way that it cannot pass several times through the machine. Thereby swindle is prevented. Such a function is also a requirement in many return systems, in which a return value is paid on return of the empty packaging as for example bottles and cans.

It is normally expected that the packaging items are compacted individually, without the packaging item being divided into several pieces, which simplifies the sorting of the different types of material in a subsequent processing. However, compacting of glass is normally done by smashing, so that the glass is divided into many smaller fragments. It is desirable that one and the same compactor should allow compacting of several types of packaging, as for example plastic bottles, steel cans, aluminium cans and glass bottles of volumes from 150 milliliters to 3 liters, in order to minimize the number of modules in a reverse vending machine such as described above.

It is important for these types of devices to be robust and not require frequent repairs and maintenance.

Devices for automatic compacting of used beverage containers, which may handle plastic bottles, steel cans and aluminium cans, are known from i.a. U.S. Pat. No. 5,522, 311 and WO 00/40397. From these documents it is known to use two endless belts pressing the packaging between themselves in V-shaped funnel. Devices for the automatic compacting of cans exclusively or plastic bottles exclusively are known from a number of patents and patent applications, but this technology is considered to fall outside the object of the device according to the invention.

Compactors for use in a reverse vending machine installation which is arranged to allow compacting of containers of plastic, metal and glass are not known.

So-called belt compactors which are based on endless belts produced of a flexible material are often provided with a number of studs mounted on the belts for puncturing and gripping packaging. A device of this kind, as it is described in U.S. Pat. No. 5,522,311, is subject to great wear. In particular, it is-a disadvantage that the studs, which are formed of a hard material, e.g. steel, are mounted in the flexible belt which is produced from a soft material, e.g. rubber. The rubber is worn by both friction and forces acting between the containers and the belt and forces between the studs and the rubber of the belt.

So-called belt compactors utilize endless belts consisting of rigid plates hinged together, such as described in WO 00/40397. This type of compactor is formed of a great number of parts which move individually relative to each other. Each of the so-called hinges is subjected to wear as packaging is being compacted.

Wear entails high operating costs for the device and unnecessary stoppage in connection with service.

In all belt compactors, after having been punctured, containers must follow the belt all the way over the rollers that drive the belt. This means that it will be difficult for the compactor to be constructed in such a way that the compacting times will be optimal. The compacting sequence for a plastic bottle typically consists of gripping, puncturing and pressing flat. For a can, puncturing is normally not necessary.

Belt compactors are not suitable for compacting/breaking glass because the pressure of the belt is normally distributed across too large an area for the glass to be broken.

DETAILED DESCRIPTION OF THE INVENTION

The object of the invention is to provide a compactor which is capable of quick, simple and efficient compacting of empty containers, so that costs related to handling, storing and transport are reduced, while at the same time the containers are destroyed in such a way that recognizable properties, e.g. shape, are changed so much that repeated insertion into a reverse vending machine with subsequent additional payment of return value will not be possible.

A compactor according to the invention is provided with two sets of jaws, so-called jaw sets, in which each jaw is formed as a rod, and in which the underside of the rod, which comes to rest on the containers, is formed with teeth. The jaws are supported on two co-rotating eccentric shafts that make the jaws move in an eccentric parallel motion during operation. The two jaw sets are formed in such a way that each alternate jaw, as seen transversally to the moving direction, belongs to a first jaw set, whereas the other jaws belong to the second jaw set. The jaw sets are supported on common shafts, but are 180 degrees offset relative to the centres of rotation of the shafts. The jaw sets are placed at an angle above a conveyor belt, so that the distance between the jaw sets and the conveyor belt is the smallest at the outlet end portion of the belt.

The compactor may be provided with partition walls placed between two jaws, thus forming two or more parallel channels through the compactor. The teeth of the jaws may be formed differently in the channels, as each tooth of one set of teeth, individually or in groups, may be formed in such a way that the tooth/teeth perform a particular task, such as gripping, puncturing, hammering or crushing. In the following an area of such a particular task is called a segment. Segments of a jaw may also be without teeth if this is desirable, e.g. in order to achieve flat-pressing. Each jaw is formed individually to exert optimum compacting of a type of packaging, e.g. metal, plastic or glass.

On the portions of the jaws that are intended for compacting plastic bottles, the teeth of at least a portion of the set of teeth are formed so that they have at least two peaks beside each other relative to the longitudinal direction of the jaws. Thereby the teeth grip the bottle at the same time as the bottle is being punctured.

The conveyor belt comprising an endless band and necessary driving elements carries containers in below the jaw sets. Below the conveyor belt itself is mounted a support plate which acts as a holding-up means for the jaws during compacting.

With respect to angle and distance relative to the conveyor belt segments of each jaw may be so formed that method and degree of compacting may be selected for each channel.

At its feeding portion the conveyor belt is hinged to the structure of the compactor. A spring mechanism, e.g. in the form of a gas spring, is arranged between the discharge end portion of the conveyor and the structure of the compactor. The spring mechanism is arranged to limit the maximum force that may be applied to a container between the band and the jaws.

If a container or another object, which does not allow compacting, enters the compactor, the spring device will yield, so that the object can be carried through the compactor without damaging the components thereof. If the object is too large to be carried through the compactor, the belt conveyor will be subjected to a force which causes the release of a switch and the compactor is stopped. The spring mechanism may then be released and the belt conveyor lowered, so that the object may be removed.

BRIEF DESCRIPTION OF THE DRAWINGS

In the following is described a non-limiting example of a preferred embodiment which is visualized in the accompanying drawings, in which.

DETAILED DESCRIPTION OF THE DRAWINGS

Figure 1:
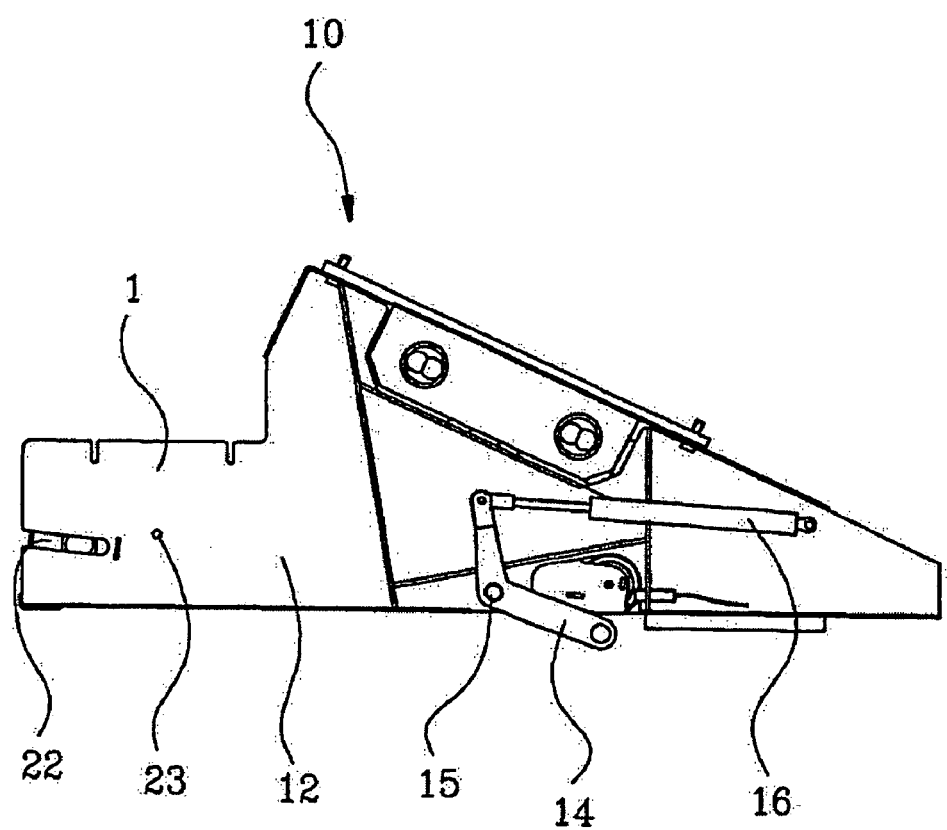
FIG. 1 shows the compactor in a side view, seen from the gas spring side.
Figure 2:
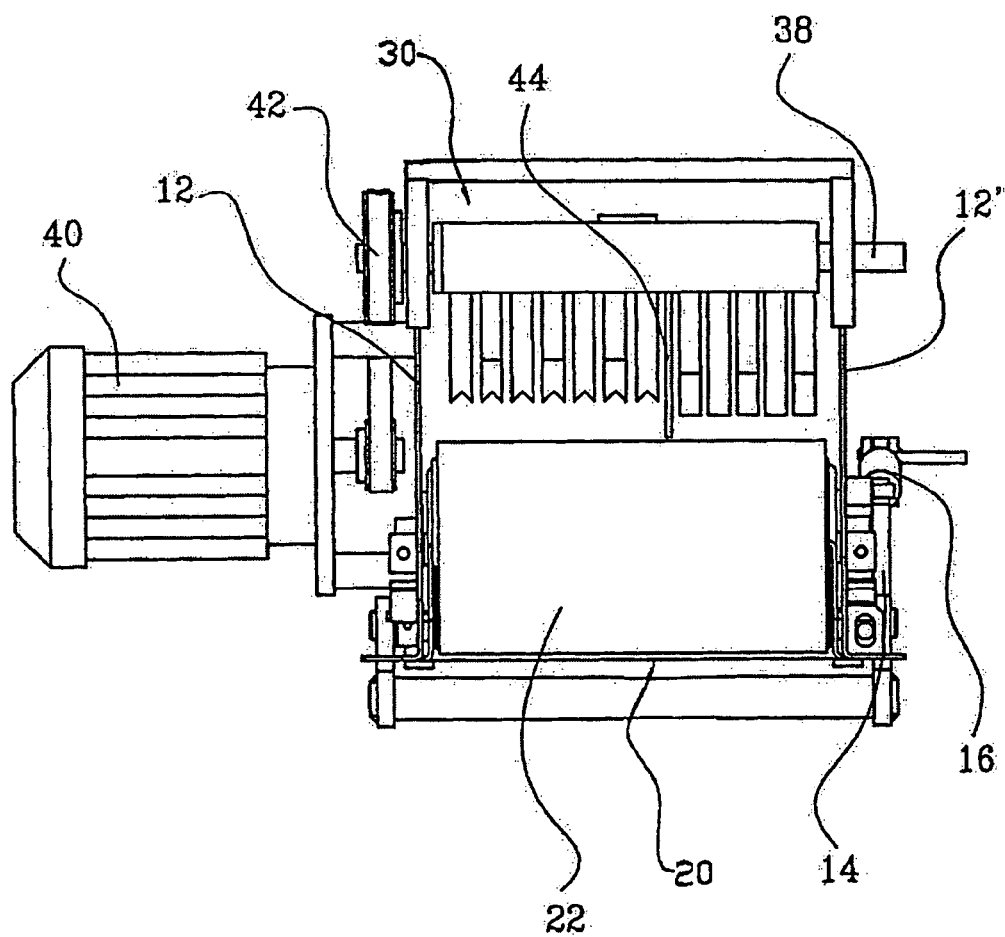
FIG. 2 shows the compactor in a side view, seen from the feeding side.
Figure 3:
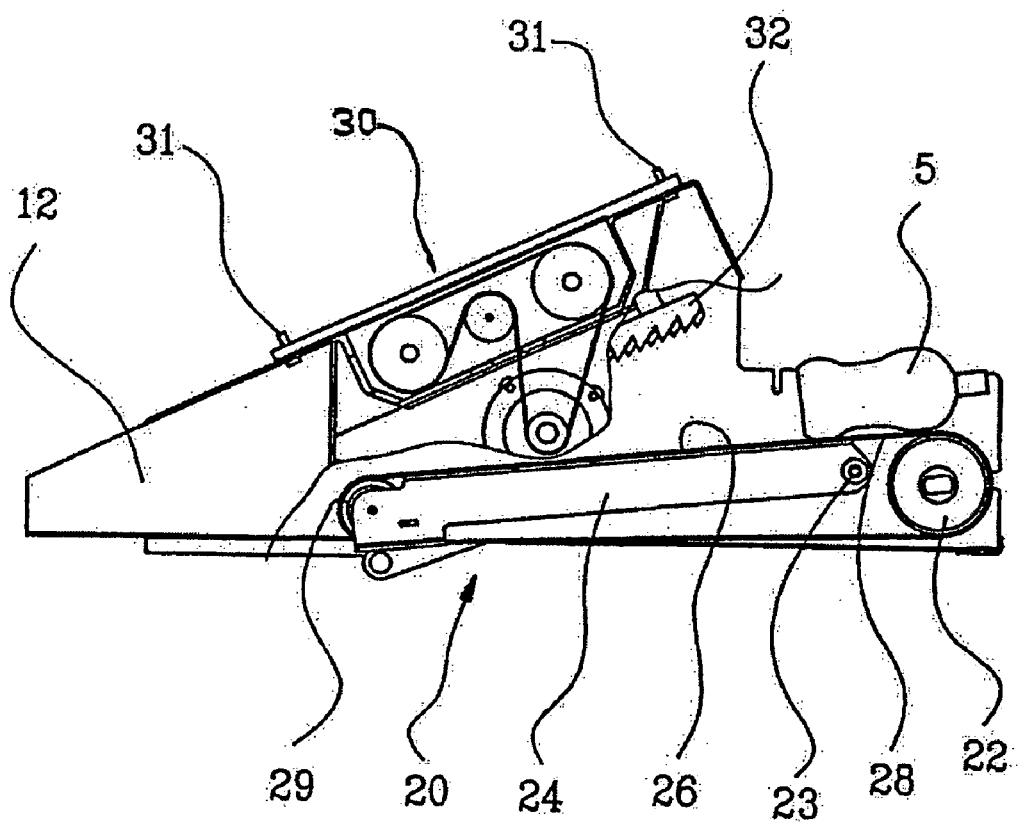
FIG. 3 shows the compactor, partly in a sectional side view, seen from the driving side.

In the drawings the reference numeral 1 identifies a compactor comprising a structure 10, a conveyor belt 20 and a jaw device 30. The structure 10 is provided with sidewalls 12, 12' arranged to absorb the forces from the jaw device 30 and form a securing point for a driving motor 22 and pivoting point 23 of the conveyor belt 20 and rotational point 15 for a release arm 14. A gas spring 16 is connected to the release arm 14. The operation of the release arm 14 will be described below.

Besides the combined drive roller/motor 22 the conveyor belt 20 comprises a frame structure 24 comprising a support plate 26, a belt 28 and a turning roller 29.

Figure 4:
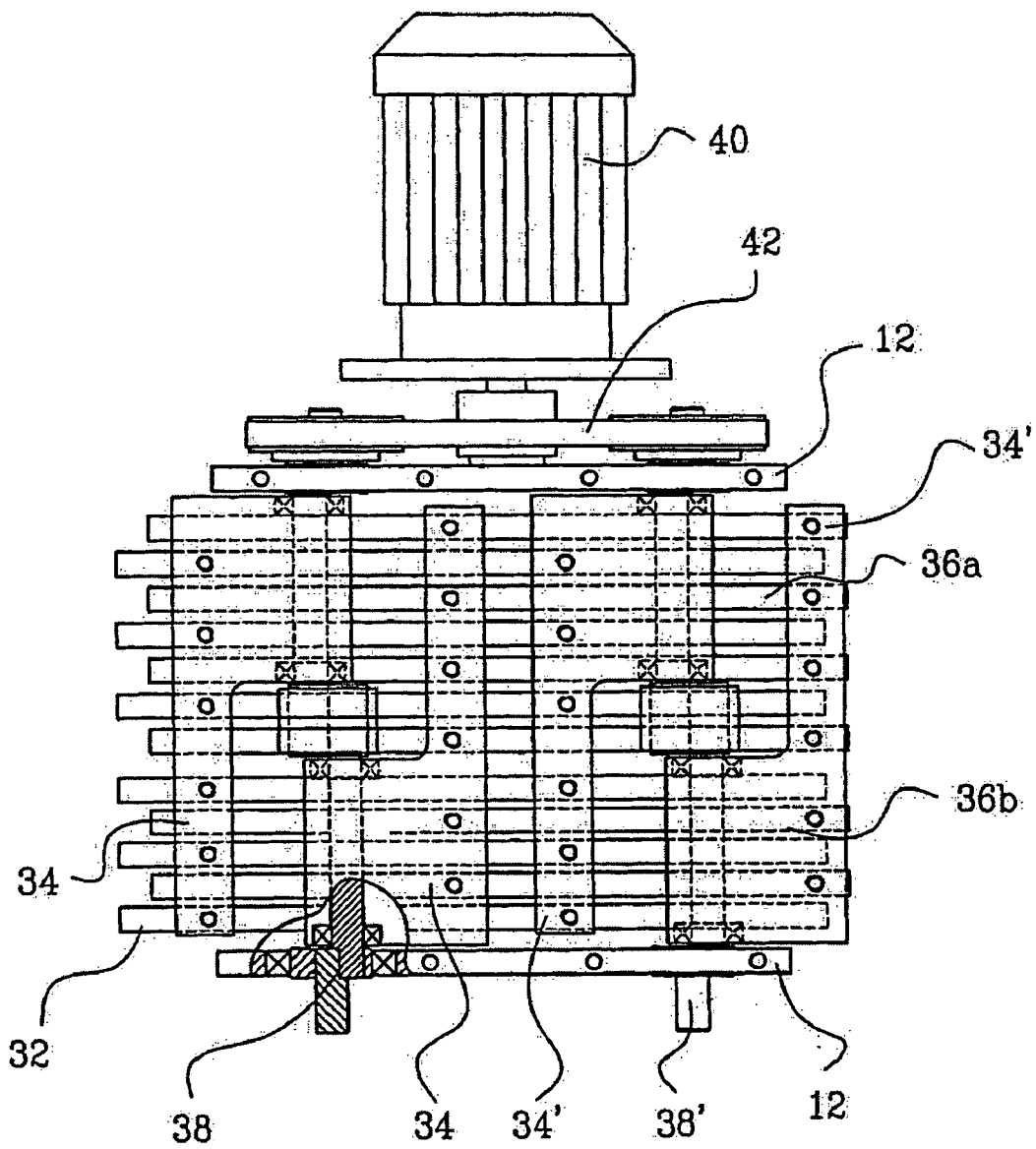
FIG. 4 shows the jaw operation of the compactor, seen from above.
Figure 5:
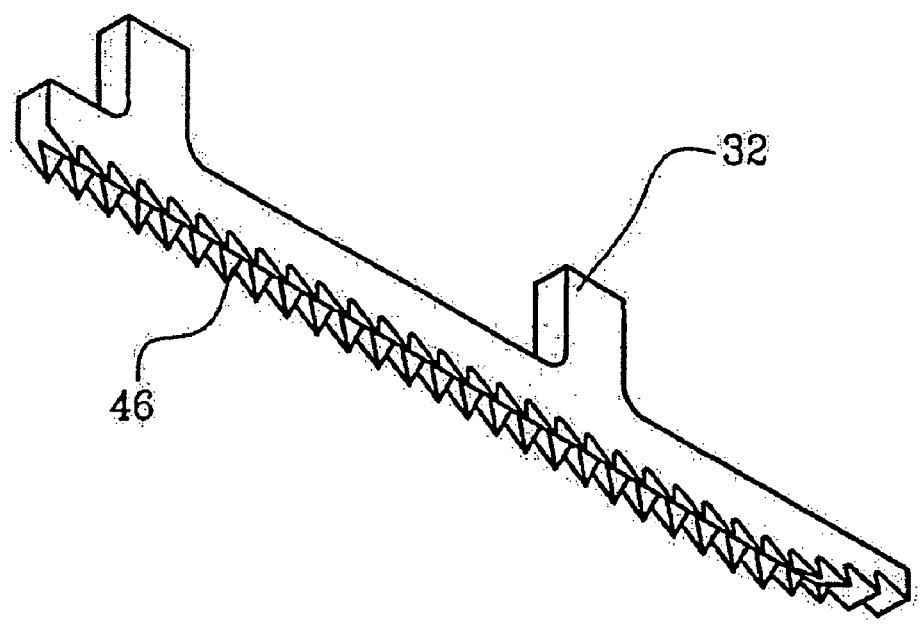
FIG. 5 shows, in perspective, a jaw with teeth for the compacting of plastic containers.

The jaw device 30 is placed above the conveyor belt 20, and is sloping down towards the turning roller 29. The jaw device 30 is connected to the sidewalls 12 by means of bolts 31 and is thereby arranged to allow easy dismantling for maintenance or replacement. Two sets of jaws 32, see FIG. 5, are connected to a mounting plate 34 each. Two mounting plates 34, 34' and a number of jaws thus form a-jaw sets 36a and 36b, see FIG. 4. Two jaw sets 36a and 36b are rotationally supported on two common eccentric shafts 38, 38', so that the supports of the jaw sets are rotated through 180 degrees relative to one another relative to the centre of rotation of the eccentric shafts 38, 38'. The eccentric shafts 38, 38' are rotatably secured to the sidewalls 12, 12' and driven by an electric motor 40 through a belt transmission 42.

Seen transversally to the longitudinal axis of the conveyor 20, each alternate jaw 32 belongs to the jaw set 36a or 36b, respectively. When the eccentric shafts 38 rotate, the jaw sets 36a and 36b are moved in eccentric parallel paths, while being offset at the same time, so that when one jaw set, for example 36a, is in its upper position, the jaw set 36b is in its lowermost position. One or more partition plates 44 divides the active area of the compactor 1 into two or more channels.

On their underside, which will be in contact with the containers, the jaws 32 are provided with teeth 46 which are arranged to grip and possibly also puncture the containers.

For the compacting of a container 5, containers 5 are placed on the entrance side of the conveyor belt 28 above the driving motor 22. If the compactor is provided with one or more partition plates 44, the channel adapted for the packaging in question is selected. The first jaw set 36a and the second jaw set 36b rotate at the same frequency and 180 degrees out of phase. When the container 5 touches one jaw set 36a which is moving in a direction towards the belt 28, one or more teeth 46 of one or more jaws 32 will grip the container 5 and possibly puncture it. After the first jaw set 36a has gripped the container, the jaw sets 36a 36b and the conveyor belt 28 together will pull the container 5 further into the compacting area between the conveyor belt 28 and the jaw device 30. Since the jaw sets 36a and 36b are moving 180 degrees out of phase, at least one of the jaw sets 36a 36b will always be in contact with the container 5. The eccentric and parallel movements of the jaw sets 36a 36b will cause the teeth 46 of the jaw 32 to be forced into the container 5 before the container 5 is pulled forward. When the forward-pulling motion of the jaws 32 is complete, 180 degrees later, the teeth 46 of the first jaw set 36a are withdrawn from the container 5 while the teeth 46 of the second jaw set 36b are simultaneously forced down into the container 5. The first jaw set 36a then returns to its initial position by a 360 degrees' rotation of the shafts 38, and the sequence is repeated. This motion results in a continuous compacting based on a series of partial compactings performed by the jaw sets 36a and 36b.

Figure 6:
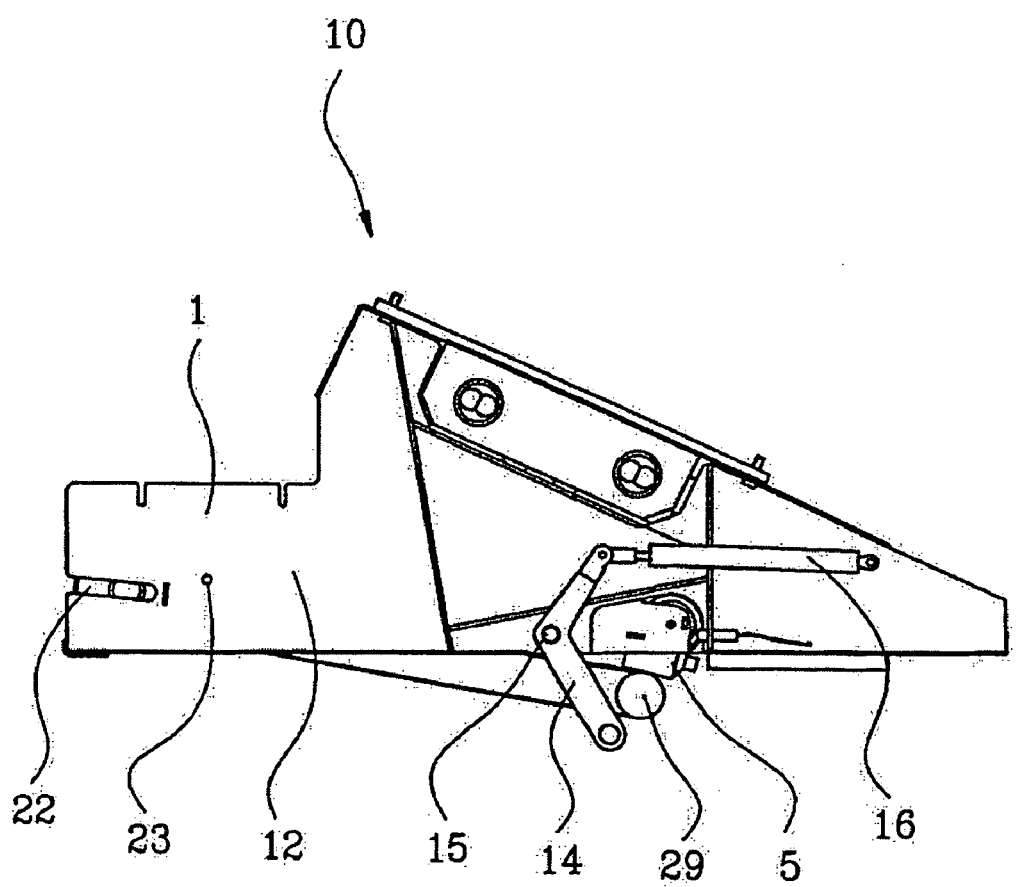
FIG. 6 shows the compactor in a side view, seen from the gas spring side in a state of operation, in which the conveyor belt is in a lower position.

If a container 5 or another object which does not allow compacting, enters the compactor 1, the gas spring 16 is arranged to yield by way of the release arm 14 which is supported on the rotational point 15 and connected to the turning roller portion of the conveyor belt 28, so that the conveyor belt pivots on the pivotal suspension 23, whereby the container 5 may pass through the compactor 1 without the conveyor belt 28 being overloaded, see FIG. 6.

In the following is described the compacting/processing of a number of different containers 5. It is implied that terms like can, plastic bottle, glass bottle etc. refer to kinds of containers 5.

Compacting of beverage cans of metal is effected in that the beverage cans are pressed flat individually, so that cans of steel and aluminium may easily be separated in subsequent processing. Some beverage cans are provided with a built-in 5 gas cartridge. The aim of the gas cartridge is to produce foam in the content of the can, e.g. beer, when the can is opened by the consumer. It is essential that the device 1 is arranged to compact cans containing these kinds of gas cartridges.

The compacting of plastic bottles with screwed-on caps requires puncturing of the bottle before compacting. Without puncturing, the bottle will return to its original shape after having been compacted, because of the air pressure formed inside the bottle. In at least one portion of the jaw 32, the jaws 32, which are arranged to compact plastic bottles, are provided with teeth 46 formed by two peaks beside each other relative to the longitudinal direction of the jaw 32. Plastic bottles with caps may contain liquid, and this liquid may cause problems for the compactor 1 and the collecting packaging. Normally the amount of liquid per bottle will be limited because the container is normally weighed in a device located upstream relative to the compactor 1. Containers 5 with too much liquid are returned to the user. It will still be possible for containers containing liquid to be admitted into the compactor 1. The puncturing is therefore done by means of the jaws 32 which are located above the container, whereby a considerable proportion of possible liquid will remain in the container without this leading to unnecessary spillage within the compactor and in the collecting cases/bags.

Compacting of glass bottles is effected in that the bottle 5 is broken by a quick blow against a limited part of the bottle 5, so-called hammering. The bottle 5 will then separate into a number of fragments depending on the type of glass. The fragments will be carried out of the compactor by means of the belt conveyor.

In the manner described above, a quick, simple and efficient compacting of containers 5 is achieved, without this causing unnecessary wear on the device 1. The operating costs for the device 1 will thereby be low. The chamber and associated jaws 32 of the compactor 1 may easily be adapted for the type of material to be compacted without this changing the basic structure of the compactor.

Any configuration of the jaws is possible as long as the receiving area between the jaw sets 36a, 36b and the conveyor belt 20 is essentially cuneiform, and the teeth 46 of the jaws 32 perform the task intended relative to the type of material to be processed.

What is claimed is:

1. A compactor device for compacting containers (5) to flatten or crush the containers characterized in that: a cuneiform compacting area is formed between a conveyor (20) and a first jaw set (36a) and a second jaw set (36b), containers received on said conveyor being moved in a longitudinal direction of the conveyor; said jaw sets having a plurality of jaws (32) which are provided with teeth (46) on their active sides, the jaws of one jaw set alternating with the jaws of the other jaw set in a direction transverse to the longitudinal direction of said conveyor; and each of the jaw sets (36a, 36b) being rotatably connected to a rotatable eccentric shaft (38, 38'), the eccentric shafts (38, 38') being so formed that the eccentric motion of the jaw sets (36a, 36b) when the shafts are rotated is parallel with respect to one another and out of phase.

2. A device according to claim 1, characterized in that a conveyor belt (28) is provided with a support plate (26) below the conveyor belt (28) of conveyor (20), the support plate (26) being arranged to support the conveyor belt (28) against the force of the jaws (32) during compacting.

3. A device according to claim 1, characterized in that individually or in groups, the teeth (46) of the jaws (32) are arranged to perform gripping, puncturing, hammering or pressing flat of a container (5).

4. A device according to claim 1, characterized in that the compactor (1) is provided with one or more partition plates (44), wherein the partition plates are configured such that channels are formed through the compactor (1).

5. A device according to claim 1, characterized in that jaws (32) which are arranged to compact plastic bottles are provided, at least on part of the jaw (32), with teeth (46) formed by two peaks beside each other relative to a direction of elongation of the jaw (32).

6. A device according to claim 1, characterized in that the compactor (1) is provided with a spring device (16), wherein the spring device is connected by a release arm (14) to the discharge end portion of the conveyor (20), and is arranged, on overloading of a conveyor belt (28) of conveyor (20), to lower the conveyor (20) for preventing overloading of the compactor (1).

7. A device according to claim 1, characterized in that the eccentric shafts are formed such that the eccentric motion of the jaw sets is 180 degrees out of phase.

8. A device according to claim 1, wherein said compactor device is a component of a reverse vending machine.

* * * * *